United States Patent [19]

Lazet

[11] 3,960,532

[45] June 1, 1976

[54] PREPARING ALKALI METAL SILICATE GLASS WITH BUBBLES

[75] Inventor: Frank J. Lazet, Media, Pa.

[73] Assignee: Philadelphia Quartz Company, Valley Forge, Pa.

[22] Filed: May 29, 1975

[21] Appl. No.: 582,070

Related U.S. Application Data

[63] Continuation-in-part of Ser. No. 448,105, March 4, 1974, abandoned.

[52] U.S. Cl. .................. 65/22; 65/30 R; 65/134; 23/313 AS; 106/74; 423/332; 423/334

[51] Int. Cl.² .............. C03B 19/08; C01B 33/32; C03C 3/00

[58] Field of Search .............. 65/134, 30 R, 22, 32, 65/20; 106/74; 423/332, 334; 23/313, 313 AS

[56] References Cited
UNITED STATES PATENTS

| | | |
|---|---|---|
| 2,264,246 | 11/1941 | Lytle ........................... 65/22 |
| 3,030,736 | 4/1962 | Penberthy ..................... 65/134 |
| 3,498,802 | 3/1970 | Bickford et al. ............... 65/30 R |
| 3,558,297 | 1/1971 | Carney et al. ................. 65/134 |
| 3,690,822 | 9/1972 | Myers ........................... 423/334 |
| 3,712,941 | 1/1973 | Myers ........................... 65/134 X |
| 3,782,906 | 1/1974 | Pierce ........................... 23/313 AS |
| 3,840,359 | 10/1974 | Lazet ............................ 106/74 X |
| 3,874,861 | 4/1975 | Kurz ............................. 65/20 |

FOREIGN PATENTS OR APPLICATIONS 570,946   2/1959   Canada ........................... 423/334

*Primary Examiner*—S. Leon Bashore
*Assistant Examiner*—Frank W. Miga
*Attorney, Agent, or Firm*—Fred Philpitt

[57] ABSTRACT

Improved production of alkali metal silicate glass is achieved by vigorous steam bubbling through the molten glass bed during the preparation of glass by fusion. Such practice results in higher production using less fuel and the product glass is easier to dissolve and results in solutions of greater clarity.

8 Claims, No Drawings

PREPARING ALKALI METAL SILICATE GLASS WITH BUBBLES

The present application is a continuation-in-part of my copending application Ser. No. 448,105 filed Mar. 4, 1974, now abandoned.

BACKGROUND

Soluble alkali metal silicate glasses and most glasses are prepared by charging raw materials into a furnace heated to 1093°C (2000°F) or more to melt and react the raw materials and form a bed of molten silicate glass. The raw materials are usually called "batch" and in producing soluble silicate glass it consists essentially of a source of sodium such as sodium carbonate and a source of silica such as sand. The "batch" is charged to the furnace and floats on the molten glass until it melts and reacts to become part of the glass bed. The materials that form the "batch" have dissimilar densities which tend to cause segregation of the components, in batching operations and in the furnace prior to melting. The segregation in the furnace is brought about partly by bubbles of $CO_2$ which are liberated and rise from the soda ash and rising through the unreacted and unmelted "batch". Non-uniform products and losses of raw materials can also be caused by the rush of combustion gases through oil or gas fired furnaces. These high velocity gas streams entrain particles of raw materials, usually the lighter soda ash and carry them out of the furnace or into various parts of the furnace superstructure. In the usual practice of most glass makers the molten bed is quiescent except for slow moving convection currents that are set up between areas of different bed temperatures throughout the furnace. The effect of these convection currents is rather limited. One method of alleviating these problems is to carry out the fusion at a higher temperature and for a longer period of time, increasing the effect of the convection currents thereby producing a somewhat more homogeneous product. Although this is the usual practice in the glass industry there is a considerable energy penalty associated with it.

Another difficulty encountered by the soluble silicate industry is that of reducing the particle size of the product glass. In general, soluble silicate glasses are tough and resist fracturing so that grinding and other methods of sub-division must be used to produce small glass particles that dissolve more quickly. Such processes are also energy intensive and introduce impurities into the resulting ground materials and subsequently into the solutions prepared from such material.

A problem that is not of importance to the soluble silicate industry but is of prime importance to the glass industry, is the removal of seeds or gas bubbles from the glass. These gas bubbles which may be $CO_2$ or air do not separate from the glass spontaneously, primarily because of the viscous nature of the glass. Apparently this problem which essentially is one of refining the glass, can be alleviated by bubbling steam and then oxygen through the molten glass to remove the entrapped gas bubbles as shown by Shadduck in U.S. Pat. No. 2,331,052. A similar system of refining, and in this case mixing the molten glass, is shown by Arbeit in U.S. Pat. No. 3,015,190 in which gases, including steam, are bubbled through a very limited portion of the molten glass in a conduit. In both these patents a limited number of bubblers are employed directly in a zone of molten glass influenced by a burner. Also, the bubbling provided in these systems is relatively slow and bubbles of the steam and/or oxygen do not remain in the glass after it is drawn from the furnace and cooled. A third process involving steam bubbling is described by Fenstermacker in U.S. Pat. No. 3,617,231 which relates to controlling the working temperature of glass by addition of water supplied by steam bubbling. In this process the steam bubbling is confined to a forehearth through which the glass is drawn after melting and refining.

It is an object of the invention of this application to provide a method whereby homogeneous glass can be prepared without using higher fusion temperatures for longer periods, but in fact uses lower temperatures and shorter periods, thereby saving fuel or increasing production. It is a further object of this invention to provide glass that contains bubbles and is therefore easily shattered or fractured, and dissolves up to 40% faster than glass that has not been subjected to steam bubbling.

SUMMARY OF THE INVENTION

I have found that placing steam bubblers in certain concentrations and configurations in glass making furnaces and maintaining very vigorous steam bubbling during the production of soluble alkali metal silicates leads to production improvements as well as more homogeneous products. The product glass also contains many bubbles so that it is easily fractured and granulated, alleviating one of the problems hereinbefore discussed. Surprisingly, bubbling in the furnace allows increased production while using only the same amount of fuel. The molten glass becomes hotter when vigorously bubbled because of improved heat transfer and therefore more raw materials can be put through the furnace. Further advantages of this process are that particulate air pollution and loss of raw materials are significantly reduced.

THE INVENTION

The alkali metal silicate glass formed by the process of this invention can be sodium silicate, potassium silicate or mixed alkali silicate containing both sodium and potassium. Various raw materials are used in preparing these glasses but generally alkali metal carbonates and sand are used. For example, sodium silicate glass is usually prepared using sodium carbonate (soda ash) and sand. The raw materials are fused in an open hearth type furnace of regenerative or recuperative design, fired with natural gas or oil. Electric resistance type furnaces can also be used where advantageous. The temperatures employed depend to some extent on the composition of the glass but are usually above about 1093°C. The composition of such glasses is given by the mol ratio of $SiO_2/M_2O$, wherein M stands for sodium and/or potassium. I have found that this invention can be used to prepare binary glasses that contain alkali and silica and is of particular advantage in preparing soluble alkali metal silicate glasses with a silica to alkali ratio of 1.5 to 4.5 parts of $SiO_2$ per part of $M_2O$. This process enables the production of sodium silicate glass that is soluble at $SiO_2/Na_2O$ ratios above those that are generally recognized to be readily soluble.

Present practice in both the glass and the soluble silicate industry can be summarized as follows. The raw materials are introduced into the furnace through charging ports by chargers that push the raw batch into the furnace by mechanical means. The batch floats on top of the molten glass bed in piles or ridges until it begins to melt and react. The unreacted batch is maintained only in the portion of the furnace between the charging port(s) and the "hot spot." The "hot spot" is the location in the furnace that is maintained at the highest temperature by various heating means. The unreacted batch can be maintained between the charging port(s) and the "hot spot" because the glass level is higher at the "hot spot" as the result of temperature gradients. In the glass industry practice any gas bubblers used are located at or near the hot spot so that this arrangement is not disturbed. Gas bubblers are not usually used in the soluble silicate industry.

In contrast to the above described practice, the process of this invention does not develop any "hot spot(s)" in the silicate furnace. The unreacted batch is distributed throughout the entire furnace evenly and with proper operation of the bubbling system no high piles nor ridges or "unreacted batch" are seen in the furnace. This thinner uniform layer of batch allows better heat transfer from the burners to the molten glass and the "unreacted batch."

There are various bubbling means available by which gases can be introduced into a liquid. For purposes of introducing steam bubbles into a molten glass bed I prefer to mount tubing of stainless steel or other heat resistant materials in the bottom of the furnace. The tubing may be mounted in a refractory block but this is not necessary at all times. There should be one bubbler for every 8 to 30 ft$^2$ (0.7 to 2.8 m$^2$) of furnace bed. I prefer to use one bubbler for every 10 to 20 ft$^2$ (0.9 to 1.8 m$^2$) of furnace bed. The optimum appears to be one bubbler for each 12 to 15 ft$^2$ (1.1 to 1.4 m$^2$). The bubblers must be distributed throughout the entire furnace bed so that all portions of the molten glass bed are influenced by the bubbling. The distribution of the bubblers throughout the furnace area is in contrast to the usual practice in the glass industry wherein the bubblers are limited to the "hot spot" of the furnace or are located directly under the burners heating the glass. I have found it advantageous to position a substantial proportion in front of the draw hole and the charging ports. The bubblers in front of the draw hold supplement or replace a "skimmer" block in preventing floating batch from being carried out of the "draw hold" with the molten glass. The bubblers near the draw hold also assure that the product glass will contain bubbles.

The bubblers in front of the charging ports are essential in distributing the batch evenly throughout the furnace bed area and thereby promoting in part better heat transfer. The positions and relationship of these bubblers to the charging port and each other are very important. Three bubblers are positioned in front of each charging port in a non-symetrical group according to the following description, in which "W" represents the width of the charging port. The center of the first bubbler is in front of the port at a position 1 to 1½W inside the furnace and ¼ to 1/6W from the center line of the port opposite to the center of the furnace. The center of the second bubbler is 1¼ to 2¼W inside the furnace and ⅛ to ⅔W from the center line of the port toward the center of the furnace. The center of the third bubbler is 1½ to 2½W inside the furnace and 1/6 to ¼W from the center line of the port toward the center of the furnace. For example, a furnace with charging ports of 24 inches (61 cm) with the first three bubblers arranged as follows, operated with a uniform batch layer upon the surface of the molten glass. The first bubbler was positioned 30 inches (76.5 cm) from the charging port and 5 inches (125 cm) from the center line of the port opposite to the center of the furnace. The second bubbler was positioned 39 inches (99 cm) from the port and 16 inches (40.5 cm) from the center line of the port toward the center of the furnace. The third bubbler was positioned 45 inches (114 cm) from the port and 5 inches (12.5 cm) from the center line of the port toward the center of the furnace. Additional bubblers can be used in front of the ports with good results.

The steam pressure required to introduce bubbles into the glass so that they rise from the bottom of the glass bed to the top varies with the viscosity of the molten glass and the bed depth. The pressure is adjusted to provide bubbles of 8 to 18 inches (20.3 to 45.7 cm) in diameter at a rate of 5 to 20 bubbles per second. I prefer that bubbles of about 10 to 14 inches (25.5 to 35.5 cm) in diameter be formed. Steam pressure of 2.5 to 150 psig (0.18 to 10.5 kg/cm$^2$) yield the desired bubbling activity. I prefer to use 35 to 125 psig (2.45 to 8.75 kg/cm$^2$). If the vigorous bubbling specified herein is maintained, mixing of the raw batch with the molten glass is achieved near the top of the molten bed and refractory corrosion on the bottom of the furnace is greatly reduced or eliminated. A furnace operated for 60 weeks according to the process of this invention showed no wear or corrosion of the bottom refractories. If the bubbling activity is intermediate between that described herein and that practiced by the glass industry as described in the prior art or in some cases at the levels of the prior art, unreacted or partially reacted batch is carried to the bottom of the furnace and severe corrosion of the refractories adjacent to the bubblers results. For example, in a furnace operating according to the process of this invention one bubbler became partially blocked so that only 10 to 30 bubbles per minute reached the surface of the glass. The refractories adjacent to the bubbler became so erroded that the glass broke through the bottom of the furnace. No refractory attack was noted at the other bubbler sites.

A surprising result of vigorous steam bubbling is that the glass bed becomes hotter without increased use of fuel. If steam bubbling is added to a producing furnace, it can be operated at a crown temperature 65° to 100°C lower than without steam bubbling while maintaining the same production rate. Alternatively, additional raw materials may be charged and the production rate increased.

Another result of this widespread and vigorous steam bubbling is that the glass when it is drawn and after it cools and becomes rigid, contains numerous bubbles. A very important result is that the glass when discharged from the molds fractures so that in some cases no granulation step need be carried out.

The use of dry saturated steam with no condensate in it is most critical. Wet steam causes eruptions or geysers through the glass and subsequent tossing of unreacted batch and sometimes molten glass into the area above the glass bed. Water entering with the steam expands about 1700 times in volume causing geysers of molten glass to hit the crown of the furnace. Such action leads to increased air pollution and loss of raw materials. The use of dry steam does not cause these problems and indeed reduces particulate air pollution. A further demonstration that it is necessary to bubble with steam to obtain full benefits from this process was seen when air was substituted for steam. The resulting glass drawn from the furnace did not fracture when released from the molds.

In order to carry out the process of this invention a molten glass bed consisting essentially of alkali and silica can be formed and the steam bubblers activated, as charging of the raw materials continues. I prefer to activate the steam bubblers in an empty but fired furnace and then commence feeding the raw materials. The temperature is held above 1093°C and a molten glass bed is formed. The additional feed or "batch" charged is distributed on top of the molten glass by the three bubblers in front of the charging port. The batch is drawn into the bed of molten glass and mixed with the glass in the top ¼ of the bed depth by the remaining bubblers. Sand grains can be seen in the bubbles on top of the glass. After the furnace bed is full, the furnace is tapped and the glass is drawn.

The glass realized from the process is homogeneous and contains about 0.05 to 2.0% water. I prefer the preparation of glass containing more than 0.5% water. The glass dissolves at a rate of at least 10% and up to 40% faster than glass that has been made without steam bubbling. The bubbled glass dissolves completely and forms solutions that are almost water clear. Glasses made without bubblers operating have turbidities higher than 120 ppm and generally 150 ppm or more. With a few steam bubblers operating but not the number required by the process of this invention the glasses prepared dissolve to form solution of about 120 ppm turbidity. Glasses made according to the process of this invention dissolve to form solutions of about 40 ppm turbidity.

It is difficult to determine the exact increase in the production rate realized from use of this invention. Many factors affect the production rates of glass-making furnaces as all such furnaces are neither constructed nor operated in exactly the same manner. However, I have found that the production rate for any given furnace can be increased from at least about 5% up to 75% through the use of steam bubbling. A number of glass furnaces had production rates of 21.5 to 26.5 lbs of glass/ft$^2$-hour (105 to 129 kg of glass/m$^2$ hour). The utilization of steam bubblers in accordance with this invention increased the production to between 27 and 40 lb of glass/ft$^2$-hour (132 and 195 kg of glass/m$^2$-hour). This more efficient use of energy is demonstrated by the fact that furnaces without bubblers generally require 2350 to 3300 BTU/lb of glass (1307 to 1835 Cal/kg of glass) while furnaces with steam bubbling systems working require 2000 to 3100 BTU/lb of glass (1112 to 1724 Cal/kg of glass).

A number of the results obtained from using extremely vigorous steam bubbling in the production of soluble silicate glass according to the process of this invention are unexpected and surprising. As discussed previously, the percolation of $CO_2$ liberated from the soda ash through the unreacted batch contributes to segregation of the batch and to non-uniform products. The action of the $CO_2$ gas also contributes to air pollution and loss of raw materials since it tends to toss particles of the batch into the stream of combustion gases where they are entrained and carried from the furnace. It is therefore surprising that introducing still more gas and immensely more vigorous bubbling does not increase these problems but actually ameliorates them. It is also surprising that the flow of very large volumes of gas through the molten glass bed does not decrease the temperature of the glass. It would be expected that the gas would conduct heat away from the glass bed since it is injected at a temperature hundreds of degrees lower than that of the glass bed. In contrast to such expectations the process of this invention increases the temperature of the glass and reduces the energy required to produce the glass.

EXAMPLES

The following examples illustrates certain embodiments of my invention and are not to be considered restrictive.

EXAMPLE 1

This example illustrates the production of sodium silicate glass by the prior art method using no steam bubblers. A furnace with a bed area of 375 ft$^2$ (34.8 m$^2$) was charged with 59 batches of sand and soda ash per 8 hour shift. Each batch contained 820 lb (372 kg) of sand and 575 lb. (261 kg) of soda ash. The crown temperature was about 1370°C or 2500°F. The glass was drawn and white lumps were seen to stream out with the glass. These lumps were found to consist of unreacted sand or glass of very high $SiO_2/Na_2O$ ratio. The glass was cooled and required granulation before charging to the dissolver. The first dissolving required 20 minutes to attain the desired density of 50° Baume (Specific Gravity of 1.34). The second dissolving required 1 hour and 50 minutes to attain the desired density. The analysis of the solution was 13.87% $Na_2O$ and 33.26% $SiO_2$ with a $SiO_2/Na_2O$ ratio of 2.40. The turbidity of the silicate solution was 185 ppm as measured on a Coleman nephlometer. The silicate solution was allowed to settle for 2 weeks and the turbidity was 140 ppm.

The furnace output for this operation was measured at 24.5 lb/ft$^2$-hour (119.5 kg/m$^2$-hour). The energy required was 2350 BTU/lb of glass (1307 Cal/kg of glass).

EXAMPLE 2

This example illustrates the production of sodium silicate glass by the method of this invention. The furnace described in Example 1 was equipped with 20 bubbler units or 1 for each 18.75 ft$^2$ (1.74 m$^2$). The bubblers were operated at 30 psig (21.0 kg/cm$^2$) steam pressure and more than 10 steam bubbles per second were breaking the surface of the molten glass. The furnace was charged with 74 batches of sand and soda ash as described in Example 1 and the "batch" was seen to be drawn under the molten glass bed. The crown temperature was 1370°C. When the glass was drawn, no white lumps were observed. The glass was cooled and easily granulated, then charged to the dissolver used in Example 1. The first dissolving required 15 minutes to attain the desired density of 50° Baume. The second dissolving required 1 hour and 40 minutes. The analysis of the solution was 13.85% $Na_2O$ and 33.20% $SiO_2$ with a $SiO_2/Na_2O$ ratio of 2.40. The turbidity of the solution was 10 ppm.

The furnace output for this operation was 27.3 lb/ft$^2$-hour (133 kg/m$^2$-hour). The utilization of energy was about 2140 BTU/lb of glass (1190 Cal/kg of glass). These production rates and heat utilization figures were limited by the auxiliary equipment associated with this furnace and these figures could be improved still further as a result of this invention.

EXAMPLE 3

A smaller glass melting furnace of 164 ft² (15.2 m²) was equipped with steam bubblers in such a manner that experiments could be carried out with 12, 6 or 0 bubblers in operation. No attempts were made to obtain the most efficient operation of the furnace under any one set of conditions. The production rate for this furnace with 6 or 12 bubblers operating was 28 lb/ft²-hour (137 kg/m²-hour), with no bubblers operating the rate was 26 lb/ft²-hour (127 kg/m²-hour). The increase in production rate as a result of bubbling was 7.7%. In another run using 12 bubblers an increase of 11.9% in the production rate was achieved. A fuel saving of 5.5% was achieved by using bubblers in this furnace.

EXAMPLE 4

Stack emission tests were run on the furnace described in Example 3 with 6 and 0 steam bubblers in operation. The results of these runs are summarized in the following table.

|  | 6 Bubblers | 0 Bubblers |
|---|---|---|
| Grains/ft³ | 0.0223 | 0.0275 |
| Optical density | 0.020 | 0.029 |
| Lbs/hour | 0.98 | 1.20 |
| Opacity (%) | 4.50 | 6.46 |

EXAMPLE 5

A furnace with a bed area of 410 ft²(38 m²) was found to produce soluble silicate glasses of various $SiO_2/Na_2O$ ratios at the rates and requiring the energy indicated in the following table.

| $SiO_2/Na_2O$ Ratio | 1.70 | 2.00 | 3.22 |
|---|---|---|---|
| Production rate |  |  |  |
| Lbs/ft²-hour | 29.5 | 29.6 | 27.0 |
| Kg/m²-hour | 147 | 144.5 | 132 |
| Energy requires: |  |  |  |
| BTU/lb | 2700 | 2600 | 2575 |
| Cal/kg | 1501 | 1446 | 1432 |

This furnace was equipped with 20 steam bubbler so that there was an average one bubbler for every 20 ft² (1.86 m²) of furnace bed. A single bubbler was placed in front of one of the charging ports while no bubbler was placed in front of the other charging port. While the unreacted batch covered almost the entire furnace bed area, heavy batch ridges were observed, particularly in the area of the charging port without a steam bubbler positioned in front of it. The batch charged into the port with a single bubbler in front of it was dispersed somewhat but batch ridges could be seen to travel through the furnace. The production rate and energy utilization for the furnace equipped in this manner is summarized in the following table.

| $SiO_2/Na_2O$ | 1.70 | 2.00 | 2.40 | 3.22 |
|---|---|---|---|---|
| Production rate |  |  |  |  |
| Lb/ft²-hour | 31.7 | 34.0 | 32.0 | 32.8 |
| Kg/m²-hour | 154.5 | 166 | 156 | 160 |
| Energy required |  |  |  |  |
| BTU/lb | 2375 | 2300 | 2300 | 2200 |

-continued

| $SiO_2/Na_2O$ | 1.70 | 2.00 | 2.40 | 3.22 |
|---|---|---|---|---|
| Cal/kg | 1320 | 1279 | 1279 | 1223 |

These figures represent substantial increases in the efficiency of this furnace.

Five additional steam bubblers were installed in the furnace so that 3 bubblers were positioned in front of each charging port as follows. The charging port was 24 inches (61 cm) wide; the first bubbler was 30 inches (76.5 cm) from the port and 5 inches (12.5 cm) from the center line of the port away from the center of the furnace. A second bubbler was 45 inches (114 cm) from the port and 5 inches (12.5 cm) on the other side of the center line of the port from the first bubbler. The third bubbler was 39 inches (99 cm) from the port and 16 inches (40.5 cm) from the center line of the port toward the center of the furnace. With this modification the furnace was equipped with one bubbler for every 14.1 ft² (1.31 m²). With these additional bubblers operating no batch piles or ridges could be seen moving in the furnace. Instead a uniform, thin layer of batch was spread over the entire furnace bed except directly over the bubblers where a pool of molten bubbling glass was exposed. It could be seen that the bubbles bursting on the surface of the glass contained grains, probably sand not yet completely reacted. Production rates for 2.40 and 3.22 ratio glasses were 35.3 lb/ft²-hour (172.0 kg/m²-hour) and 34.4 lb/ft²-hour (168 kg/m²-hour) indicating substantial increase in the production rate resulting from this preferred embodiment of my invention.

EXAMPLE 6

The glasses produced as described in Example 5 demonstrate the increased solubility of glasses produced according to the process of my invention. When glass that was not subjected to steam bubbling was charged to the dissolver associated with this furnace, the dissolver limited the furnace to a production rate of 27 lbs/ft²-hour(132 kg/m²-hour). When steam bubbling was used the increased solubility of the glass allowed production at 36 lb/ft²-hour (176 kg/m²-hour) before the dissolver was overcharged.

I claim:

1. The process for producing alkali metal silicate glass having a mol ratio of 1.5 to 4.5 parts of $SiO_2$ per part of $M_2O$ wherein M is selected from the group consisting of sodium, potassium and mixtures of sodium and potassium and containing 0.05 to 2% water and sufficient bubbles to promote fracturing, comprising the steps of:
   a. charging raw materials, sources of alkali selected from the group consisting of sodium carbonate, potassium carbonate and mixtures of sodium carbonate and potassium carbonate, and a source of silica such as sand into an open hearth furnace with a bed area for fusion reactions, equipped with a draw hole and charging ports;
   b. maintaining the temperature within said furnace above 1093°C so that a bed of molten silicate glass is formed and the unreacted raw materials float on said molten glass bed;
   c. introducing dry saturated steam under pressure into the molten glass through bubbling means located in the furnace bed area so that bubbles of steam pass from the bottom of said molten glass bed to the top, the pressure of said steam being regulated to produce bubbles 8 to 18 inches (20.3 to 45.7 cm) in diameter breaking the surface of the molten blass at a rate of 5 to 20 bubbles per second; and d. withdrawing said molten glass from the furnace.

2. The process of claim 1 wherein the steam pressure is 2.5 to 150 psig (0.18 to 10.5 kg/cm$^2$).

3. The process of claim 1 wherein the steam pressure is 35 to 125 psig (2.45 to 8.75 kg/cm$^2$).

4. The process of claim 1 wherein there is an average of 1 bubbling means for each 8 to 30 ft$^2$ (0.7 to 2.8 m$^2$) of furnace bed area.

5. The process of claim 1 wherein there is an average of 1 bubbling means for each 10 to 20 ft$^2$ (0.9 to 1.8 m$^2$) of furnace bed area.

6. The process of claim 1 wherein there is an average of 1 bubbling means for each 12 to 15 ft$^2$ (1.1 to 1.4 m$^2$) of furnace bed area.

7. The process of claim 4 wherein a non-symetrical group of 3 bubbling means is positioned in front of each charging port, the width of said ports being represented by W, and said bubbling means arranged as follows:

a. the center of the first bubbling means is in front of the port at a position 1 to 1½W inside the furnace and 1/6 to ¼W from the center line of the port opposite to the center of the furnace;

b. the center of the second bubbling means is 1¼ to 2¼W inside the furnace and ⅛ to ⅖W from the center line of the port toward the center of the furnace; and c. the center of the third bubbling means is 1½ to 2½W inside the furnace and 1/6 to ¼W from the center line of the port toward the center of the furnace.

8. The process of claim 7 wherein said non-symetrical group contains more than 3 bubbling means.

* * * * *